United States Patent [19]

Sheesley

[11] 3,909,011
[45] Sept. 30, 1975

[54] RETAINER
[76] Inventor: John M. Sheesley, P.O. Box 14604, Houston, Tex. 77021
[22] Filed: Apr. 8, 1974
[21] Appl. No.: 459,032

[52] U.S. Cl. .................... 277/11; 277/180; 285/363
[51] Int. Cl.² .......................................... F16J 15/00
[58] Field of Search .......... 277/11, 180, 9, 101, 189, 277/223, 166; 285/363, 379, 368

[56] References Cited
UNITED STATES PATENTS
1,282,068  10/1918  Gold .................................. 285/379
3,573,870  4/1971  Gastineau ........................... 277/11
3,620,554  11/1971  Ward .................................. 277/11

Primary Examiner—Richard E. Aegerter
Assistant Examiner—L. Footland

[57] ABSTRACT

A retainer device for fixedly retaining a seal between two joined pipe flanges, and sealingly encircling the pipes communicating conduit portions. This retainer, being adjustable, may be used with flanges having diversely positioned circles of bolts.

3 Claims, 6 Drawing Figures

RETAINER

BACKGROUND OF THE INVENTION

There have been many previously-developed solutions to the problem of sealingly joining two flanged elements. Such industrial requirements are manifold. For example, a long string of pipe is built up by connecting the flanges of adjacent pieces of tubing. In order to prevent leakage from or into the communicating conduits, annular seals have normally been placed intermediate the flanges and radially exterior of the conduit's external diameter.

In addition to the need to continually seek cost reduction measures, a continuing problem posed within this area has involved the quantities of materials that must be stocked. For example wherein seals are being fabricated for use between adjacent pipe flanges, not only does the internal diameter vary, but, the circle of bolts placement may vary, even for the same internal diameter. Thus a need has existed to provide a combination seal-spacer, or a spacer that may be used in a variety of "size" situations. Another and earlier approach to the problem at hand is presented in the U.S. Pat. Nos. 3,521,892 and 3,531,133. The invention discussed herein after is believed to represent a unique solution.

SUMMARY OF THE INVENTION

An annular sealing device or ring is fixed or snap fitted to a spacer or retainer member. Such member forms a clip having opposed clip-forming components, between which is fitted the sealing ring. The open, opposite ends of each clip-forming component are contained by a slide member. One of such slide members would be apertured so as to be fixedly positioned in juxtable position between a particular hole of the circle-of-bolt holes of the adjacent flanges. The other of the slide members would have a cutaway portion at its periphery, permitting it to be adjustably positioned adjacent to and inward of an opposite bolt of such circle of bolts.

DESCRIPTION OF THE INVENTION

This invention is intended to be used to seal an internal passageway. An example of such would be to seal a connection of adjacent sections of pipe or conduit, both from fluid escape, and from external contamination.

Normally, adjacent pipe sections will each include a flange. Such flanges are placed in an adjacent relationship, and bolted together, or otherwise affixed. When bolted, each flange would have, near its outer periphery, a circle of bolt holes, through which bolts extend for fixing the flanges together. Obviously, the internal diameters of the pipe section may vary, depending on the intended use. Further, even with a given internal diameter, the diameter of the circle-of-bolt holes may vary, again depending on the intended use.

Figure 5:
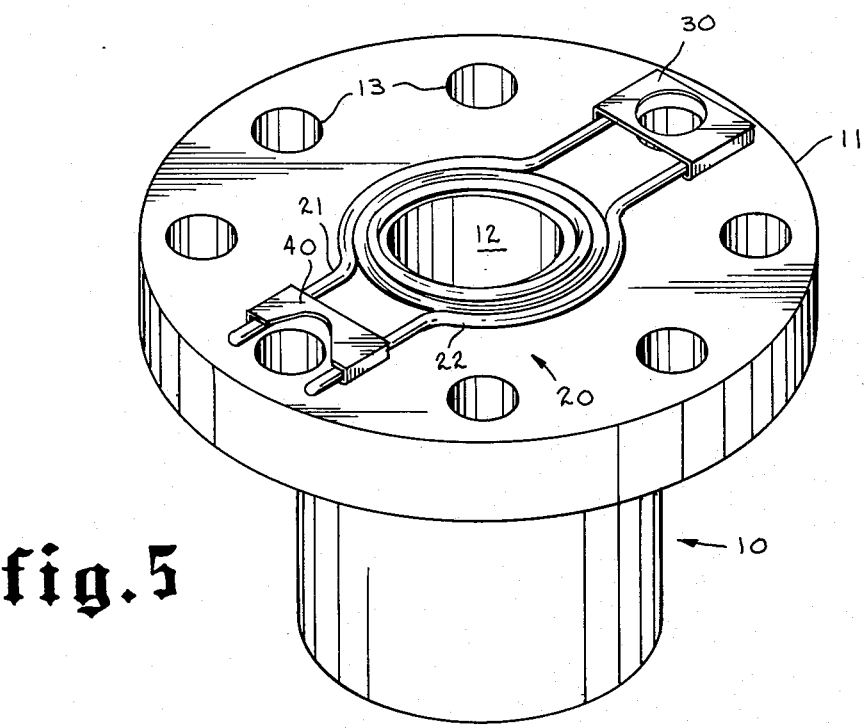
FIG. 5 is a perspective of the sealer-spacer in place on a pipe flange.

Looking at FIG. 5, such a section of pipe is illustrated at the numeral 10. The section would have a flange 11 at the one end shown, and an internal passageway therethrough at 12. Circumferentially spaced around the flange, near its periphery, and extending through the flange, are spaced apertures 13, forming a circle-of-bolt holes.

Looking now specifically at FIGS. 1–4, a spacer or retainer is illustrated generally at 20. The retainer of this invention is shown as having 4 basic parts. First, there are a pair of oppositely disposed generally tubular members or struts 21 and 22. Each of said struts is centrally curved or bulged, as at 23 and 24. On assembly, said curved portions are oppositely disposed.

Toward one end of the assembly, is a first slide portion 30. This slide is essently a flat plate having curved sides 31, which form a substantially 180° bend, forming slots within which slots one pair of ends of struts 21,22 may be slidably accommodated. This slide is centrally apertured at 32.

Toward the opposite end of the assembly is a second slide portion 40. This slide is also essentially a flat plate having curved sides 41, which also form a substantially 180° bend, forming slots within which slots the other pair of ends of struts 21,22 may be slidably accomodated. This latter slide member has a cutout portion 42, for purposes hereinafter discussed.

Figure 1:
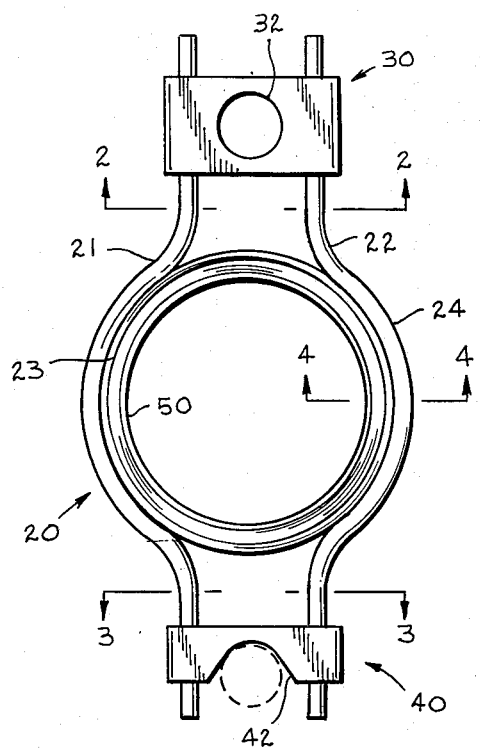
FIG. 1 is a top plan view of the assembled spacer-retainer.
Figures 2, 3:
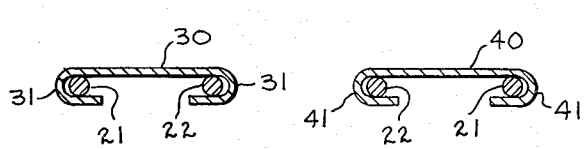
FIGS. 2 and 3 are sections taken along lines 2—2 and 3—3, respectively, of FIG. 1.
Figure 4:
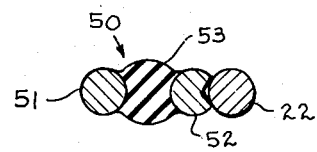
FIGS. 4 and 4a represent sectional view taken along line 4—4 of FIG. 1, said FIGS. 4 and 4a depicting alternate arrangements of the snap-fit arrangement.
Figure 4A:
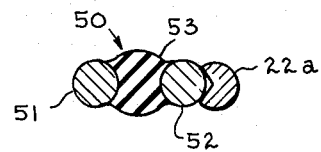

FIGS. 1,4 and 4a depict an annular sealing sealing element 50. The particular components of member 50 do not form, as such, a portion of this invention. For illustrative purposes, the sealing member 50 may include a pair of concentric rings 51,52. Such rings are joined by annular deformable seal portion 53. Seal members of this type are described in the previously listed U.S. patents.

FIGS. 4 and 4a show diverse means of fitting the seal member 50 to the spacer retainer portion 20. In FIG. 4 the outer ring member 52 is externally grooved to receive struts 21,22, while in FIG. 4a, the struts, such as 22a are internally grooved to receive the seal member. In either case, a snap-fit is possible for ease of assembly.

Consider now the overall assembly. A seal member, such as 50, would be chosen for the particular internal diameter of the tubing with which the assembly is used. Then, a particularly sized spacer assembly, such as 20, would be chosen, again as a function of the internal diameter of the related tubing. This latter feature is permitted by virtue of slide members 30 and 40, ie., the variations in the circle-of-bolts placement is rendered irrelevant. Slide member 30 would be slidably affixed to one end of struts 21,22. Then, aperture 32 would be positioned over one of apertures 13 in flange 11. On assembly, a bolt would pass through such apertures 13 and 32 as well as through such an aperture 13 in the adjacent pipe flange. The other slide member 40 may then be adjustably positioned on the opposed ends of struts 21, 22 so as to be positioned adjacent an opposite bolt hole. Thus, on mating the flanges of adjacent sections of conduit, the seal member and the spacer of this invention will be clamped, therebetween so as to effectively seal the communicating passageways 12 of the said adjacent sections, both against leakage and contamination.

Although only limited embodiments of this invention have been described, it should be obvious that numerous modifications would be possible by one skilled in the art without departing from the spirit of the invention, the scope of which is limited only the the following appended claims.

I claim:

1. A spacer assembly for positioning a seal member about an opening, said spacer assembly comprising:

a pair of spaced apart struts, each strut having a centrally curved portion adapted to receive a seal, therein, and portions extending from each side of the curved portion;

first and second positioning members, connected to opposite ends of said struts, said positioning members having means adapted to receive securing means whereby said spacer assembly may adjust to accommodate different size openings in a flange.

2. A spacer assembly for positioning a seal member about an opening, said spacer assembly comprising:

a pair of spaced apart struts, each strut having a centrally curved portion adapted to receive a seal therein and portions extending from each side of the curved portion;

first and second slide portions slidably positioned near opposite ends of said struts having means adapted to receive securing means whereby said assembly may adjust to accommodate different size openings in a flange, one of said slide portions having an aperture therethrough.

3. A spacer assembly for positioning a seal member about an opening, said spacer assembly comprising:

a pair of spaced apart struts, each strut having a centrally curved portion adapted to receive a seal therein and portions extending from each side of the curved portion;

first and second slide portions slidably positioned near opposite ends of said struts having means adapted to receive securing means whereby said assembly may adjust to accommodate different size openings in a flange, one of said slide portions having a cutout portion along one side.

* * * * *